United States Patent
Wang et al.

(10) Patent No.: US 11,904,580 B2
(45) Date of Patent: Feb. 20, 2024

(54) MULTILAYER FILM WITH IMPROVED PROPERTIES

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT); Stefan Ortner, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/998,880

(22) PCT Filed: May 14, 2021

(86) PCT No.: PCT/EP2021/062803
§ 371 (c)(1),
(2) Date: Nov. 15, 2022

(87) PCT Pub. No.: WO2021/233772
PCT Pub. Date: Nov. 25, 2021

(65) Prior Publication Data
US 2023/0382091 A1 Nov. 30, 2023

(30) Foreign Application Priority Data
May 18, 2020 (EP) .................................. 20175211

(51) Int. Cl.
| B32B 27/32 | (2006.01) |
| B29C 48/00 | (2019.01) |
| C08L 23/12 | (2006.01) |
| C08L 23/16 | (2006.01) |
| B32B 27/08 | (2006.01) |
| B29K 23/00 | (2006.01) |

(52) U.S. Cl.
CPC ........ *B32B 27/327* (2013.01); *B29C 48/0018* (2019.02); *B32B 27/08* (2013.01); *C08L 23/12* (2013.01); *C08L 23/16* (2013.01); *B29C 48/022* (2019.02); *B29K 2023/12* (2013.01); *B29K 2023/16* (2013.01); *B32B 2250/02* (2013.01); *B32B 2250/03* (2013.01); *B32B 2250/242* (2013.01); *B32B 2270/00* (2013.01); *B32B 2307/54* (2013.01); *B32B 2307/558* (2013.01); *B32B 2307/5825* (2013.01); *B32B 2307/7376* (2023.05); *B32B 2323/10* (2013.01); *B32B 2439/06* (2013.01); *B32B 2439/46* (2013.01); *C08L 2203/16* (2013.01); *C08L 2205/025* (2013.01); *C08L 2205/22* (2013.01); *C08L 2205/24* (2013.01); *C08L 2207/02* (2013.01); *C08L 2314/02* (2013.01); *C08L 2314/06* (2013.01)

(58) Field of Classification Search
None
See application file for complete search history.

(56) References Cited

U.S. PATENT DOCUMENTS

2004/0116607 A1* 6/2004 Malm .................. C08F 10/06
525/240

FOREIGN PATENT DOCUMENTS

| CN | 102348751 A | 2/2012 |
| CN | 110177833 A | 8/2019 |
| EP | 0887379 | 12/1998 |
| EP | 1028984 B1 | 7/2001 |
| EP | 1183307 B1 | 7/2005 |
| EP | 3003708 A1 | 4/2016 |
| EP | 3078490 A1 | 10/2016 |
| EP | 3650494 A2 | 5/2020 |
| RU | 2670886 C9 | 12/2018 |
| WO | 92/12182 A1 | 7/1992 |
| WO | 1994/0014856 A1 | 7/1994 |
| WO | 1995/0012622 A1 | 5/1995 |
| WO | 99/24478 A1 | 5/1999 |
| WO | 99/24479 A | 5/1999 |
| WO | 00/68315 A1 | 11/2000 |
| WO | 2002/002576 A1 | 1/2002 |
| WO | 2004/000899 A1 | 12/2003 |
| WO | 2004/111095 A1 | 12/2004 |
| WO | 2006/0097497 A1 | 9/2006 |
| WO | 2007116034 A1 | 10/2007 |
| WO | 2010/117148 A2 | 10/2010 |
| WO | 2010117148 A2 | 10/2010 |
| WO | 2011/0076780 A1 | 6/2011 |
| WO | 2011/0135004 A1 | 11/2011 |
| WO | 2012/0001052 A3 | 1/2012 |
| WO | 2012/0084961 A1 | 6/2012 |
| WO | 2013007650 A1 | 1/2013 |
| WO | 2015/0158790 A2 | 10/2015 |
| WO | 2018/122134 A1 | 7/2018 |
| WO | 2019/052820 A1 | 3/2019 |
| WO | 2019/091887 A1 | 5/2019 |

OTHER PUBLICATIONS

Applicant: Borealis AG; "Multilayer Wilm With Improved Properties"; International Application No. PCT/EP2021/062803; PCT International Search Report and Written Opinion; Authorized Officer: E.Iraegui Retolaza; dated Sep. 21, 2021; 12 pgs.

(Continued)

*Primary Examiner* — Samir Shah
(74) *Attorney, Agent, or Firm* — TAROLLI, SUNDHEIM, COVELL & TUMMINO L.L.P.

(57) ABSTRACT

The present invention relates to a multilayer blown film including at least one skin layer (A) including a Ziegler Natta catalyzed heterophasic propylene copolymer (HECO) and one inner layer (B) including a metallocene catalyzed propylene based random copolymer (PRC), and optionally one core layer (C) including either a Ziegler Natta catalyzed heterophasic propylene copolymer (HECO) or a metallocene catalyzed propylene based random copolymer (PRC).

12 Claims, No Drawings

(56) References Cited

OTHER PUBLICATIONS

Applicant: Borealis AG; European Application No. 20175211.0; Extended European Search Report; Authorized Officer: E.Iraegui Retolaza; dated Oct. 23, 2020; 5 pgs.

Busico, Vincenzo, et al. "Alk-1-ene Polymerization in the Presence of a Monocyclopentadienyl Zirconium (iv) Acetamidinate Catalyst: Microstructural and Mechanistic Insights." Macromolecular rapid communications 28.10 (2007): 1128-1134.

Cheng, H. N. "Carbon-13 NMR analysis of ethylene-propylene rubbers." Macromolecules 17.10 (1984): 1950-1955.

Masahiro Kakugo, et al.; 13C NMR Determination of Monomer Sequence Distribution in Ethylene-Propylene Copolymers Prepared with d-TiC13-Al( C2H5)2 Cl; Macromolecules 1982, 1150-1152.

Resconi, Luigi, et al. "Selectivity in propene polymerization with metallocene catalysts." Chemical Reviews 100.4 (2000): 1253-1346.

Singh, Gurmeet, Ajay V. Kothari, and Virendra K. Gupta. "Triad sequence determination of ethylene-propylene copolymers—application of quantitative 13C NMR." Polymer Testing 28.5 (2009): 475-479.

Wang, Wen-Jun, and Shiping Zhu. "Structural analysis of ethylene/propylene copolymers synthesized with a constrained geometry catalyst." Macromolecules 33.4 (2000): 1157-1162.

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

Chinese Office Action dated Apr. 24, 2023.
Russian Office Action dated Apr. 28, 2023.

\* cited by examiner

MULTILAYER FILM WITH IMPROVED PROPERTIES

The present invention relates to a multilayer blown film comprising at least one skin layer (A) comprising a Ziegler Natta catalyzed heterophasic propylene copolymer (HECO), and one inner layer (B) comprising a metallocene catalyzed propylene based random copolymer (PRC), and optionally one core layer (C) comprising either a Ziegler Natta catalyzed heterophasic propylene copolymer (HECO) or a metallocene catalyzed propylene based random copolymer (PRC).

Flexible plastic packaging, typically in the form of stand-up pouches, films, bags, liners, or wraps, is one of the fastest growing segments of the packaging industry. Flexible packaging helps to safeguard the quality and safety of consumer and industrial products, but also fulfils consumer demand for value-added functionality and convenience. Compared to rigid packaging alternatives such as glass and metal, flexible plastic packaging demonstrates better performance when it comes to sustainability parameters such as lower overall carbon footprint.

High standards are nowadays required for flexible packaging materials. Quite often properties are required in the packaging industry, which are conflicting. Typically, high stiffness and toughness as well as excellent sealing behaviour, like low sealing initiation temperature (SIT), and good optics are required in parallel. To achieve these different properties seldom pure components, but rather combinations of different polymer components are used. Two different approaches mainly are at the skilled person's disposal: (a) blends of two or more polymers to form a heterophasic structure, or (b) producing a multilayer structure with different materials providing different functions. Both of them are applied in industry, the latter being even more popular since the choice of materials is more diverse without the need to consider the demanding technical questions of complex polymer blends. With multilayer structures known in the art already, multilayer films with good properties for the packaging industry are achieved. Yet up until now, a significant drawback in flexible plastic packaging involved is its complex structure.

While rigid materials are primarily monomaterial-based (e.g. entirely of glass, aluminium etc.), flexible materials have traditionally been multi-material. This makes recycling less efficient and therefore less attractive. What is more, multi-material recyclates are of only limited use, for example in lower-quality moulded applications.

A variety of multilayer films for packaging applications is known in the art.

WO 2010/117148 A2, for example, refers to a multilayer medical film, and to the use thereof, and more particularly, to a multilayer medical film comprising: an outer layer comprising one type of polypropylene polymer selected from the group consisting of polypropylene, a polypropylene copolymer, and the combination thereof; an intermediate layer comprising 10 to 60 wt.-% of one type of polypropylene polymer selected from the group consisting of polypropylene, a polypropylene copolymer, and the combination thereof, and 40 to 90 wt.-% of a thermoplastic elastomer; and an inner layer comprising 60 to 80 wt.-% of one type of polypropylene polymer selected from the group consisting of polypropylene, a polypropylene copolymer, and the combination thereof, 10 to 30 wt.-% of polyethylene, and 1 to 10 wt.-% of a thermoplastic elastomer. The high amount of thermoplastic elastomer limits the applicability of these film constructions in terms of cost and heat resistance.

As a further example, EP 3 078 490 A1 discloses a multilayer cast film, which is oriented in machine direction, comprising 3 layers A, B and C, whereby
a) layer A is an outer layer comprising a heterophasic propylene copolymer,
b) layer B is the core layer comprising a high isotacticity polypropylene homopolymer and
c) layer C is a sealing layer comprising a propylene based random copolymer or terpolymer, optionally in combination with a heterophasic propylene copolymer.

The MDO cast films are used to prepare laminates with PET and Al or OPA and have quite high sealing initiation temperatures (SIT) of above 130° C.

EP 3 003 708 A1 relates to a biaxially oriented, multilayer polypropylene film constituted of at least one base layer and one first intermediate layer and a first sealable cover layer applied to said intermediate layer, the first intermediate layer being a soft intermediate layer and all layers of the film are substantially not containing vacuoles. The film is used for producing bag packaging. Sealing temperatures of 140° C. are applied in the testing, which is much higher than desired.

Although several multi-layer films are known in the art, there is still the need to develop multi-layer structures, which provide an advantageous combination of low sealing initiation temperature (SIT), optical properties and mechanical properties, like tensile modulus and tear resistance, and which are based on polypropylene based materials only.

Accordingly, the object of the present invention is to provide a multilayer blown film, especially an unoriented multilayer blown film, having excellent sealing properties paired with good optical performance and an improved stiffness/impact balance, especially having high tensile modulus and a high tear resistance.

These objects have been solved by the multilayer blown film according to claim 1, the multilayer blown film comprising at least two layers (A) and (B) and optionally one core layer (C) located between layer (A) and (B), wherein layer (A) comprises a Ziegler Natta catalyzed heterophasic propylene copolymer (HECO) and layer (B) comprises a metallocene catalyzed propylene based random copolymer (PRC), wherein said heterophasic propylene copolymer (HECO) of Layer A comprises
a) 75.0 to 95.0 wt.-% of a polypropylene matrix (PP-M) with an $MFR_2$ (ISO 1133, 230° C., 2.16 kg) of 0.8 to 10.0 g/10 min being a homopolymer or a copolymer which has an alpha-olefin comonomer content of less than 2.0 wt.-%,
b) 5.0 to 25.0 wt.-% of an elastomeric propylene-ethylene copolymer (EPC) dispersed in said matrix (PP-M) and
c) 0.0 to 0.5 wt.-% of one or more alpha-nucleating agent(s) (NA), and is produced in the presence of a Ziegler Natta catalyst, the heterophasic propylene copolymer (HECO) having
   (i) a melt flow rate $MFR_2$ measured according to ISO 1133 (230° C., 2.16 kg load) in the range of 0.3 to 5.0 g/10 min;
   (ii) a melting temperature measured with DSC according to ISO 11357-3 in the range of 160° C. to 170° C.
   (iii) a xylene cold soluble (XCS) fraction determined according ISO 16152 (25° C.) in the range of 5.0 to 25.0 wt.-% based on the total weight of the heterophasic propylene copolymer (HECO); the xylene cold soluble (XCS) fraction having
   an intrinsic viscosity (IV) of 0.8 to 2.8 dl/g
   an ethylene content in the range of 10.0 to 45.0 wt.-%, (iv) a total ethylene content in the range of 1.0 to 10.0 wt.-%, said propylene based random copolymer (PRC) of Layer B comprises
- (i) alpha-olefin comonomers selected from ethylene and/or 1-butene in a total amount of 2.0 to 8.0 wt.-%
- (ii) a melting temperature measured with DSC according to ISO 11357-3 in the range of 110° C. to 140° C., and is produced in the presence of a metallocene catalyst, and wherein the optional core layer (C) comprises either the Ziegler Natta catalyzed heterophasic propylene copolymer (HECO) or the metallocene catalyzed propylene based random copolymer (PRC).

Advantageous embodiments of the multilayer film in accordance with the present invention are specified in the dependent claims.

The present invention further relates to the use of a multilayer film according to the present invention for flexible packaging applications, preferably pouches or lids for food packaging, for medical applications or for pharmaceutical applications.

THE MULTILAYER FILM

The present invention is directed to a multilayer blown film comprising at least two layers (A) and (B), wherein layer (A) comprises a Ziegler Natta catalyzed heterophasic propylene copolymer (HECO) and layer (B) comprises a metallocene catalyzed propylene based random copolymer (PRC).

In addition, the multilayer blown film can comprise at least one further layer, the at least one further layer being a core layer (C) located between layer (A) and (B).

Layer A:

Layer A of the inventive multilayer blown film comprises, preferably is composed of, a Ziegler Natta catalyzed heterophasic propylene copolymer (HECO).

The particular heterophasic polypropylene copolymer (HECO) of the present invention comprises at least
- (a) the matrix (PP-M) being a polypropylene homopolymer (H-PP) or a copolymer (C-PP) which has an alpha-olefin comonomer content of less than 2.0 wt.-% and
- (b) the elastomeric propylene-ethylene copolymer (EPC) dispersed in said matrix (PP-M), as defined in more detail below.

Optionally, it further comprises component (c) being an alpha-nucleating agent (NA).

The term "heterophasic polypropylene copolymer (HECO)" used herein denotes polymers consisting of a polypropylene polymer matrix resin and an elastomeric propylene-ethylene copolymer dispersed in said matrix resin and optionally an alpha-nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homo- or copolymer is present in such an amount that it forms a continuous phase, which can act as a matrix.

Component (a) of the particular heterophasic polypropylene copolymer is a propylene homopolymer or copolymer with an alpha-olefin comonomer content of less than 2.0 wt.-% forming the matrix of the heterophasic polypropylene copolymer.

Preferably, the polypropylene matrix (PP-M) is a propylene homopolymer (H-PP).

Preferably, the comonomers—if present—used for the production of the polypropylene matrix (PP-M) may be selected from, but are not limited to ethylene and/or $C_4$- to $C_{20}$-alpha-olefins. However, ethylene and/or $C_4$- to $C_{20}$-alpha-olefins are preferred, more preferred are ethylene and/or $C_4$- to $C_{15}$-alpha-olefins, even more preferred are ethylene and/or $C_4$- to $C_{10}$-alpha-olefins and most preferred are ethylene and/or $C_4$- to $C_6$-alpha-olefins.

The expression homopolymer used in the instant invention relates to a polypropylene that consists substantially, i.e. of at least 99.8 wt.-% of propylene units.

In a preferred embodiment only propylene units in the propylene homopolymer are detectable.

Said propylene homo- or copolymer matrix is present in the heterophasic polypropylene copolymer in an amount of 75.0 to 95.0 wt.-%, preferably in an amount of 80.0 to 92.5 wt.-%, more preferably in an amount of 83.0 to 90.0 wt.-%.

The propylene homo- or copolymer matrix has a melt flow rate $MFR_2$ (ISO 1133; 230° C.; 2.16 kg) in the range of 0.8 to 10.0 g/10 min, preferably in the range of 1.0 to 9.0 g/10 min, more preferably in the range of 1.5 to 8.0 g/10 min, even more preferably in the range of 2.0 to 6.0 g/10 min. Especially preferred the $MFR_2$ is in the range of 2.0 to 4.5 g/10 min.

The $MFR_2$ of the matrix is named matrix melt flow rate ($MFR_M$).

Preferably, the polypropylene matrix (PP-M) has an intrinsic viscosity (IV) of not more than 4.5 dl/g, more preferably of not more than 4.0 dl/g and most preferably of not more than 3.5 dl/g. Further, preferably, the polypropylene matrix (PP-M) has an intrinsic viscosity (IV) of at least 1.5 dl/g, more preferably of at least 1.8 dl/g and most preferably of at least 2.0 dl/g.

The propylene homo- or copolymer matrix has a melting temperature $Tm_1$ determined by DSC analysis according to ISO 11357.

Preferably, $Tm_1$ of the propylene homo- or copolymer is within the range of 160° C. to 170° C., more preferably within the range of 161° C. to 169° C. and most preferably within the range of 162° C. to 168° C. Said melting temperature $Tm_1$ of the homo- or copolymer matrix is identical to the melting temperature of the heterophasic polypropylene copolymer.

The polypropylene homo- or copolymer may comprise or consist of a single polypropylene polymer fraction (=unimodal), but may also comprise a mixture of different polypropylene polymer fractions.

In cases where the polypropylene polymer comprises different fractions, the polypropylene 30 polymer is understood to be bi- or multimodal.

These fractions may have different average molecular weight or different molecular weight distribution.

It is preferred, that the polypropylene polymer can be bimodal or multimodal in view of molecular weight or molecular weight distribution.

It is alternatively preferred, that the polypropylene polymer can be unimodal in view of average molecular weight and/or molecular weight distribution.

Thus, in one embodiment or the present invention the matrix (PP-M) is unimodal, whereas in another embodiment the matrix (PP-M) is bimodal and consists of two propylene homo- or copolymer, preferably homopolymer fractions (H-PP-1) and (H-PP-2).

Component (b) is an elastomeric propylene-ethylene copolymer (EPC), which is a copolymer of propylene and ethylene being dispersed in said matrix (PP-M) (i.e. dispersed phase).

Component (b) of the particular heterophasic polypropylene copolymer (HECO) is the so called ethylene-propylene rubber phase.

The term "ethylene-propylene rubber phase" denotes the material which is essentially dispersed in the matrix and is soluble in p-xylene under the conditions described as XCS.

The terms "elastomeric propylene-ethylene copolymer (EPC)", "xylene cold soluble (XCS) fraction of the heterophasic propylene copolymer", "dispersed phase" and "ethylene-propylene rubber" are to be interpreted in its commonly accepted meaning, i.e. they denote the same, i.e. are interchangeable.

Thus, the amount of elastomeric propylene-ethylene copolymer (EPC) constitutes the amount of the xylene cold soluble (XCS) fraction of the heterophasic propylene copolymer, which is in the range of 5.0 to 25.0 wt.-% in view of the heterophasic propylene copolymer (HECO), preferably in the range of 7.5 to 20.0 wt.-% and more preferably in the range of 10.0 to 17.0 wt.-%.

The xylene cold soluble (XCS) fraction determined according to ISO 16152 (25° C.).

The intrinsic viscosity (IV) measured according to ISO 1628-1 (at 135° C. in decalin) of the XCS fraction is in the range of more than 0.8 to 2.8 dl/g, preferably in the range of 1.2 to 2.5 dl/g and more preferably in the range of 1.6 to 2.3 dl/g.

The ethylene comonomer content of the XCS fraction is in the range of 10.0 to 45.0 wt.-%, preferably in the range of 15.0 to 40.0 wt.-% and more preferably in the range of 20.0 to 35.0 wt.-%.

The elastomeric propylene-ethylene copolymer (EPC) can either be synthesized in the later step(s) of a multistage process, after the polypropylene homo- or copolymer (a) has been synthesized.

Alternatively, the elastomeric propylene-ethylene copolymer (EPC) can be polymerized separately and mixed with the polypropylene homo- or copolymer (a) in a separate melt blending step.

It is preferred, that the incorporation of the propylene-ethylene copolymer (EPC) into the polypropylene homo- or copolymer (a) is done during a multistage polymerization process.

Like the propylene homo- or copolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Preferably the unimodal dispersed phase is made in one reaction stage, more preferably in a gas phase reactor and comprises, respectively consists of one propylene-ethylene copolymer fraction (EPC).

As optional component (c) one or more alpha-nucleating agent(s) (NA) for promoting the α-phase of isotactic polypropylene can be present in an amount of up to 0.5 wt.-%, preferably of up to 0.3 wt.-%, like in an amount of up to 0.2 wt.-%.

Such an alpha-nucleation can be carried out by using any suitable alpha-nucleating agent or alpha-nucleating method known in the art.

The alpha-nucleating agent, if present, is preferably selected from the group consisting of 1,3:2,4-bis-(3,4-dimethyl-benzylidene)-sorbitol, sodium-2,2'-methylenebis-(4,6-di-tert-butyl-phenyl)-phosphate, hydroxybis-(2,4,8,10-tetra-tert-butyl-6-hydroxy-12h-dibenzo-(d,g)(1,3,2)-dioxaphosphocin-oxidato)-aluminium, ADK STAB NA-21 (Adeka Palmarole, France), Hyperform HPN-20 E (1,2-cyclohexane dicarboxylicacid, Ca-salt, Milliken, USA) or mixtures thereof.

A further alpha-nucleation method, is a special reactor technique, where either the catalyst is prepolymerized with a polymeric nucleating agent, more preferably a vinylcycloalkane polymer and/or a vinylalkane polymer, or where the polymeric nucleating agent is introduced into the heterophasic propylene copolymer (HECO) by blending with a masterbatch (MB) together with e.g. a carrier polymer.

Preferably, the catalyst is prepolymerized with the polymeric nucleating agent, more preferably a vinylcycloalkane polymer and/or a vinylalkane polymer, said method is herein later referred to as "BNT". This method is described in detail in EP 1 028 984 and EP 1 183 307. For the purpose of this invention "BNT" is referred to as alpha-nucleating agent.

Said polymeric nucleating agent may also, preferably, the polymeric nucleating agent is introduced into the composition by prepolymerizing the catalyst used to prepare a part or all of the heterophasic propylene copolymer (HECO).

Any known polymeric nucleating agent may be employed including polymers of vinyl alkanes and vinyl cycloalkanes.

Preferred vinyl compounds to be used in the Borstar Nucleation Technology (BNT)-method are represented by the following formula

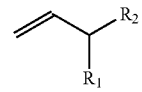

wherein $R_1$ and R2 are independently selected from C1-C$_4$-alkyl groups or they form together a saturated, an unsaturated or an aromatic five- or six-membered ring, whereby this ring may be substituted and/or bridged with one or more $C_1$- or $C_2$-alkyl groups.

More preferably the vinyl compound is selected from vinyl cycloalkanes, e.g. vinyl cyclopentane, vinyl cyclohexane, vinyl-2-methyl-cyclohexane and vinyl norbonane, 3-methyl-1-butene, styrene, p-methyl-styrene, 3-ethyl-1-hexene or mixtures thereof, particularly preferred is vinyl cyclohexane (VCH).

Preferably, the catalyst is prepolymerized in the BNT method at a temperature significantly below the polymerization temperature.

In case the catalyst is prepolymerized with the BNT method as described above, said prepolymer fraction is preferably present in an amount of up to 1.0 wt.-%, more preferably up to 0.5 wt.-% and most preferably up to 0.2 wt.-% based on the heterophasic propylene copolymer (HECO).

In case the catalyst is prepolymerized with the BNT method as described above, said prepolymer fraction is preferably present in an amount of at least 0.0001 wt.-%, more preferably of at least 0.001 wt.-%, even more preferably of at least 0.005 wt.-%, and most preferably of at least 0.01 wt.-% based on heterophasic propylene copolymer (HECO).

In an embodiment of the invention the alpha-nucleating agent is either a polymeric nucleating agent, more preferably a vinylcycloalkane polymer and/or a vinylalkane polymer, as described above or an alpha-nucleating agent selected from the group consisting of 1,3:2,4-bis-(3,4-dimethyl-benzylidene)-sorbitol, sodium-2,2'-methylenebis-(4,6-di-tert-butyl-phenyl)-phosphate, hydroxybis-(2,4,8,10-tetra-tert-butyl-6-hydroxy-12h-dibenzo-(d,g)(1,3,2)- dioxaphosphocin-oxidato)-aluminium, 1,2-cyclohexane dicarboxylic acid, Ca-salt; or mixtures thereof, e.g. a polymeric nucleating agent and 1,2-cyclohexane dicarboxylic acid, Ca-salt, can be used.

Therefore, in a preferred embodiment, the heterophasic propylene copolymer (HECO) comprises:
An optional prepolymer fraction (PRE-PP)
the propylene homopolymer or random copolymer as matrix phase (PP-M) and
a propylene-ethylene copolymer (EPC) dispersed in the matrix (PP-M).

In one embodiment of the invention, the prepolymer fraction (PRE-PP), if present, has been prepolymerized with the BNT-method as described above.

It is particular preferred, that the sum of the matrix (PP-M) and the propylene-ethylene copolymer (EPC) and, if present, prepolymer fraction (PRE-PP) make up at least 98.0 wt.-%, more preferably at least 99.0 wt.-% and most preferably at least 99.5 wt.-% of the heterophasic propylene copolymer (HECO) and most preferably the heterophasic propylene copolymer (HECO) consists of components (PP-M), (EPC) and (PRE-PP).

If the prepolymer fraction (PRE-PP) is present in the heterophasic propylene copolymer (HECO), preferably, the amount of the prepolymer fraction (PRE-PP) is up to 1.0 wt.-%, more preferably up to 0.5 wt.-% and most preferably up to 0.2 wt.-% based on heterophasic propylene copolymer (HECO).

Further, if the prepolymer fraction (PRE-PP) is present in the heterophasic propylene copolymer (HECO), preferably, the amount of the prepolymer fraction (PRE-PP) is at least 0.0001 wt.-%, more preferably is at least 0.001 wt.-%, even more preferably is at least 0.005 wt.-%, and most preferably is at least 0.01 wt.-% based on the heterophasic propylene copolymer (HECO).

Preferably, the polypropylene matrix (PP-M) is present in an amount of at least 75.0 wt.-%, more preferably of at least 80.0 wt.-% and most preferably of at least 83.0 wt.-% based on the heterophasic propylene copolymer (HECO).

Further preferably, the polypropylene matrix (PP-M) is present in an amount of not more than 95.0 wt.-%, more preferably of not more than 92.5 wt.-% and most preferably of not more than 90.0 wt.-% based on the heterophasic propylene copolymer (HECO).

The heterophasic polypropylene copolymer (HECO) suitable for the present inventions is characterized by a total melt flow rate ($MFR_T$) (ISO 1133; 230° C.; 2.16 kg) in the range of 0.3 to 5.0 g/10 min, preferably in the range of 0.8 to 4.5 g/10 min and more preferably in the range of 1.0 to 4.0 g/10 min.

It is also appreciated, that the total content of the ethylene comonomers in the heterophasic propylene copolymer (HECO) is rather moderate.

Accordingly, it is preferred that the heterophasic propylene copolymer (HECO) has a total ethylene comonomer content in the range of 1.0 to 10.0 wt.-%, preferably in the range of 2.0 to 8.0 wt.-%, more preferably in the range of 2.5 to 7.0 wt.-% and even more preferably in the range of 3.0 to 6.0 wt.-%.

In an embodiment, the heterophasic propylene copolymer (HECO) has a flexural modulus measured according to ISO 178 in the range of 800 to 2000 MPa, preferably, in the range of 1000 to 1800 MPa, and more preferably in the range of 1200 to 1600 MPa.

The heterophasic propylene copolymer (HECO) of the present invention is composed of components (a) and (b) and optional component (c).

Component (a) is present in an amount of from 75.0 to 95.0 wt.-%, preferably from 80.0 to 92.5 wt.-% and more preferably from 83.0 to 90.0 wt.-%.

Component (A-b) is present in an amount of from 5.0 to 25.0 wt.-%, preferably from 7.5 to 20.0 wt.-% and more preferably from 10.0 to 17.0 wt.-%.

Component (c) is present in an amount of from 0.0 to 0.5 wt.-%, preferably from 0.0 to 0.3 wt.-% and more preferably from 0.0 to 0.2 wt.-%.

If component (c) is added in the form of a masterbatch (MB), the amount of masterbatch containing component (c) is up to 10.0 wt.-% related to the entire heterophasic propylene copolymer (HECO), preferably up to 5.0 wt.-% and more preferably in the range of 1.5 to 3.5 Wt.-% based on the entire heterophasic propylene copolymer (HECO).

The sum of fractions (a), (b) and (c) is 100 wt.-% or lower depending on the presence of further fractions or additives or components. The ranges in percent by weight (wt.-%) as used herein define the amount of each of the fractions or components based on the entire heterophasic propylene copolymer (HECO) according to the present invention. All fractions, components and additives together give a sum of 100 wt.-%.

The heterophasic propylene copolymer (HECO) according to the present invention apart from the polymeric components and the nucleating agent (c), optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agents, UV stabilisers and acid scavengers.

Depending on the type of additive, these may be added in an amount of 0.001 to 2.0 wt.-%, based on the weight of the heterophasic propylene copolymer (HECO).

Preparation of the Heterophasic Propylene Copolymer (HECO)

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

The heterophasic propylene copolymer (HECO) according to the invention is preferably prepared by a sequential polymerization process, as described below, in the presence of a catalyst system comprising a Ziegler Natta Catalyst (ZN-C), a cocatalyst (Co) and optionally an external donor (ED).

Preferably, the polymerization process is conducted in the presence of a) a Ziegler Natta catalyst (ZN-C) comprising compounds (TC) of a transition metal of Group 4 to 6 of IUPAC, a Group 2 metal compound (MC) and an internal donor (ID), wherein said internal donor (ID) is preferably a non-phthalic compound, more preferably a non-phthalic acid ester b) a co-catalyst (Co), and c) optionally an external donor (ED).

Preferred international donors are selected from the group consisting of malonates, maleates, citraconate, succinates, glutarates, cyclohexene-1,2-dicarboxylates, benzoates and derivatives and/or mixtures thereof, preferably the internal donor (ID) is a citraconate.

Conditions for manufacturing the heterophasic propylene copolymer (HECO) are inter alia described in WO2019052820 under "Ad heterophasic propylene copolymer".

Layer B:

Layer B of the inventive multilayer blown film comprises, preferably is composed of a metallocene catalyzed propylene based random copolymer (PRC).

The propylene random copolymer (PRC) of the invention is a random copolymer of propylene and ethylene and/or 1-butene as comonomer.

The propylene random copolymer (PRC) is obtained in the presence of a metallocene catalyst and is further characterized by
- (i) alpha-olefin comonomers selected from ethylene and/or 1-butene in a total amount of 2.0 to 8.0 wt.-%, preferably 2.5 to 7.5 wt.-%, more preferably 3.0 to 7.0 wt.-% and even more preferably 3.5 to 6.5 wt.-%. The preferred comonomer is ethylene.
- (ii) a melting temperature measured with DSC according to ISO 11357-3 in the range of 110° C. to 140° C., preferably 115° to 135°, more preferably 118° C. to 132° C.

The propylene random copolymer (PRC) preferably has a melt flow rate $MFR_2$ (230° C./2.16 kg) measured according to ISO 1133 in the range of from 0.5 to 6.0 g/10 min, preferably 0.6 to 5.0 g/min, more preferably 0.8 to below 4.0 g/10 min.

Thus, a preferred propylene random copolymer (PRC) is a propylene-ethylene random copolymer having
- (a) a total ethylene content in the range of from 3.0 to 7.0 wt.-%; preferably 3.5 to 6.5 wt.-%
- (b) a melt flow rate $MFR_2$ (230° C./2.16 kg) measured according to ISO 1133 in the range of from to 5.0 g/10 min, preferably 0.8 to below 4.0 g/min and
- (c) a melting temperature Tm as determined by DSC according to ISO 11357 of from 115° C. to 135° C., preferably 118° C. to 132° C.

More preferably, the propylene random copolymer (PRC), e.g. the $C_2C_3$ random copolymer, comprises two polymer fractions (PRC-1) and (PRC-2).

In this case, the propylene random copolymer (PRC), preferably the propylene-ethylene random copolymer consists of
- 45.0 to 85.0 wt.-% of polymer fraction (PRC-1) having
  - (i) an comonomer, preferably ethylene content in the range of from 1.5 to 5.0 wt.-% and
  - (ii) a melt flow rate $MFR_2$ (230° C./2.16 kg) measured according to ISO 1133 in the range of from 0.8 to 8.0 g/10 min and
- 15.0 to 55.0 wt.-% of polymer fraction (PRC-2) having
  - (i) an comonomer, preferably ethylene content in the range of from 4.0 to 10.0 wt.-% and
  - (ii) a melt flow rate $MFR_2$ (230° C./2.16 kg) measured according to ISO 1133 in the range of from 0.1 to 3.0 g/10 min, whereby the melt flow rate $MFR_2$ (230° C./2.16 kg) of polymer fraction (PRC-2) is lower than the $MFR_2$ (230° C./2.16 kg) of polymer fraction (PRC-1), and the polymer, preferably ethylene content of polymer fraction (PRC-2) is higher than the polymer, preferably ethylene content of polymer fraction (PRC-1).

Preferably, the propylene random copolymer (PRC), more preferably the propylene-ethylene random copolymer comprises 50.0 to 80.0 wt.-% of polymer fraction (PRC-1) and 20.0 to 50.0 wt.-% of polymer fraction (PRC-2).

More preferably, the random copolymer (PRC) comprises 55.0 to 75.0 wt.-% of polymer fraction (PRC-1) and 25.0 to 45.0 wt.-% of polymer fraction (PRC-2).

Polymer fraction (PRC-1) preferably has a comonomer, preferably ethylene content in the range of from 1.8 to 4.5 wt.-% and more preferably in the range of from 2.0 to 4.0 wt.-%.

The melt flow rate $MFR_2$ (230° C./2.16 kg) measured according to ISO 1133 of polymer fraction (PRC-1) is preferably in the range of from 1.0 to 6.5 g/10 min, more preferably in the range of from 2.0 to 5.0 g/10 min.

Polymer fraction (PRC-2) preferably has a comonomer, preferably ethylene content in the range of from 4.5 to 9.0 wt.-% and more preferably in the range of from 4.7 to 8.0 wt.-%.

The melt flow rate $MFR_2$ (230° C./2.16 kg) measured according to ISO 1133 of polymer fraction (PRC-2) is preferably in the range of from 0.2 to 2.5 g/10 min and more preferably in the range of from 0.2 to 2.0 g/10 min.

The propylene random copolymer (PRC), preferably the propylene-ethylene random copolymer, is therefore preferably prepared by polymerizing propylene and comonomer, like ethylene by a sequential polymerization process comprising at least two reactors connected in series in the presence of a metallocene catalyst.

Thus, propylene random copolymer (PRC), preferably the propylene-ethylene random copolymer, is prepared in a sequential polymerization process comprising at least two polymerization reactors (R1) and (R2), whereby in the first polymerization reactor (R1) a first polymer fraction (PRC-1) is produced, which is subsequently transferred into the second polymerization reactor (R2). In the second polymerization reactor (R2), a second polymer fraction (PRC-2) is then produced in the presence of the first polymer fraction (PRC-1).

Polymerization processes which are suitable for producing the propylene random copolymer (PRC), preferably the propylene-ethylene random copolymer, generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene random copolymer (PRC), preferably the propylene-ethylene random copolymer, is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR)

according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene random copolymer (PRC), more preferably the propylene-ethylene random copolymer, as defined above, the conditions for the first reactor (R1), i.e. the slurry reactor (SR), like a loop reactor (LR), of step (a) may be as follows: the temperature is within the range of 40° C. to 110° C., preferably between 60° C. and 100° C., more preferably between 65° C. and 95° C., the pressure is within the range of 20 bar to 80 bar, preferably between 40 bar to 70 bar, hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The propylene random copolymer (PRC), preferably the propylene-ethylene random copolymer according to this invention is produced in the presence of a metallocene catalyst. Thus, the propylene random copolymer (PRC), preferably the propylene-ethylene random copolymer, is produced by a process comprising the following steps:

a) polymerizing in a first reactor (R1) propylene and comonomer, e.g. ethylene, obtaining polymer fraction (PRC-1) of the propylene random copolymer (PRC), preferably the propylene-ethylene random copolymer, b) transferring said polymer fraction (PRC-1) and unreacted comonomers of the first reactor in a second reactor (R2), c) feeding to said second reactor (R2) propylene and comonomer, e.g. ethylene, d) polymerizing in said second reactor (R2) and in the presence of said polymer fraction (PRC-1) propylene and comonomer, e.g. ethylene obtaining polymer fraction (PRC-2), said polymer fraction (PRC-1) and said polymer fraction (PRC-2) form the propylene random copolymer (PRC), preferably the propylene-ethylene random copolymer, as defined above, whereby the polymerization takes place in the presence of a metallocene catalyst comprising (i) a complex of formula (I):

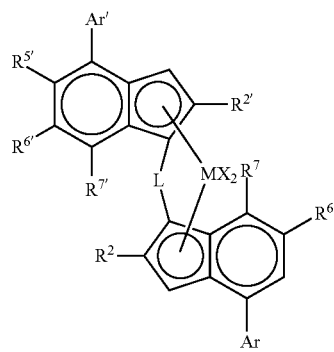

wherein M is zirconium or hafnium; each X is a sigma ligand;

L is a divalent bridge selected from —R'$_2$C—, —R'$_2$C-CR'$_2$—, —R'$_2$Si—, —R'$_2$Si-SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$-hydrocarbyl radical optionally containing one or more heteroatoms from groups 14-16 of the periodic table;

$R^{5'}$ is a $C_1$-$C_{20}$-hydrocarbyl group containing one or more heteroatoms from groups 14-16 of the periodic table optionally substituted by one or more halo atoms;

$R^6$ and R 6' are each independently hydrogen or a $C_1$-$C_{20}$-hydrocarbyl group optionally containing one or more heteroatoms from groups 14-16 of the periodic table; wherein $R^{6'}$ is preferably a tertiary alkyl group;

$R^7$ is hydrogen or $C_1$-$C_{20}$-hydrocarbyl group optionally containing one or more heteroatoms from groups 14-16 and $R^{7'}$ is hydrogen;

Ar and Ar' are each independently an aryl or heteroaryl group having up to 20 carbon atoms optionally substituted by one or more groups $R^1$;

each $R^1$ is a $C_1$-$C_{20}$ -hydrocarbyl group or two $R^1$ groups on adjacent carbon atoms taken together can form a fused 5 or 6 membered non aromatic ring with the Ar or Ar' group, said ring being itself optionally substituted with one or more groups $R^4$; each $R^4$ is a $C_1$-$C_{20}$-hydrocarbyl group; and (ii) a cocatalyst comprising at least one or two compounds of a group 13 metal of the periodic table, e.g. Al and/or boron compound.

More preferably, a cocatalyst system comprising a boron containing cocatalyst, like borate cocatalyst and an aluminoxane cocatalyst is used.

Even more preferably, the catalyst is supported on a silica support.

Ad catalyst:

Generally, the catalyst system used in the present invention may be prepared as described in WO 2018/122134 A1. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can be typically from 10 to 100 pm. However, it has turned out that special advantages can be obtained if the support has an average particle size from 15 to 80 µm, preferably from 18 to 50 µm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Preferred complexes of use in the invention are of formula (II') or (II)

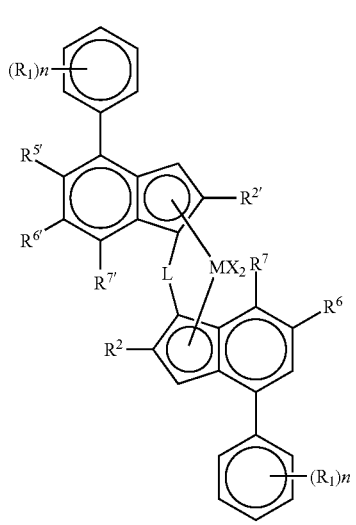

(II')

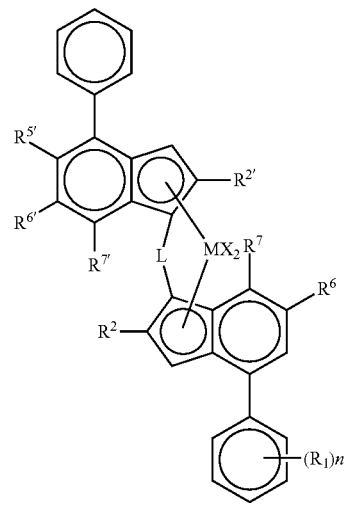

(II)

wherein M is zirconium or hafnium;
each X is independently a hydrogen atom, a halogen atom, $C_{1-6}$-alkoxy group, $C_{1-6}$-alkyl, phenyl or benzyl group;
L is a divalent bridge selected from —R'$_2$C—, —R'$_2$C-CR'$_2$—, —R'$_2$Si—, —R'$_2$Si-SiR'$_2$—, —R'$_2$Ge—, wherein each R' is independently a hydrogen atom, $C_{1-20}$-alkyl, $C_{3-10}$-cycloalkyl, tri($C_{1-20}$-alkyl)silyl, $C_{6-20}$-aryl, $C_{7-20}$-arylalkyl or $C_{7-20}$-alkylaryl;

each of $R^2$ or $R^{2'}$ is a $C_{1-10}$-alkyl group;
$R^{5'}$ is a $C_{1-10}$-alkyl group or Z'R$^{3'}$ group;
$R^6$ is hydrogen or a $C_{1-10}$-alkyl group;
$R^{6'}$ is a $C_{1-10}$-alkyl group or $C_{6-10}$-aryl group; preferably a tertiary alkyl group;
$R^7$ is hydrogen, a $C_{1-6}$-alkyl group or ZR$^3$ group and $R^{7'}$ is hydrogen;
Z and Z' are independently O or S;
$R^{3'}$ is a $C_{1-10}$-alkyl group, or a $C_{6-10}$-aryl group optionally substituted by one or more halo groups;
$R^3$ is a $C_{1-10}$-alkyl group;
each n is independently 0 to 4, e.g. 0, 1 or 2;
and each $R^1$ is independently a $C_{1-20}$-hydrocarbyl group, e.g. $C_{1-10}$-alkyl group.

Further preferred complexes of use in the invention are of formula (III') or (III):

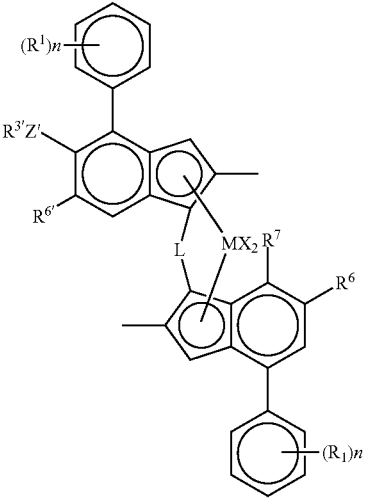

(III')

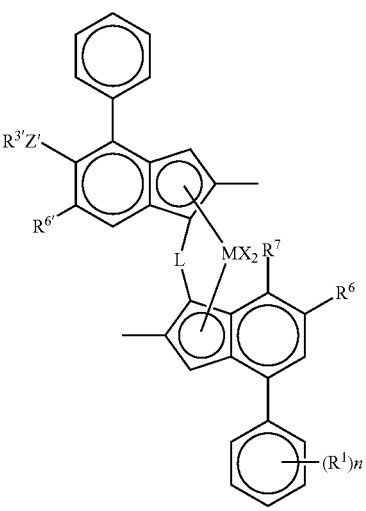

(III)

M is zirconium or hafnium;
each X is independently a hydrogen atom, a halogen atom, $C_{1-6}$-alkoxy group, $C_{1-6}$-alkyl, phenyl or benzyl group;
L is a divalent bridge selected from —R'$_2$C— or —R'$_2$Si— wherein each R' is independently a hydrogen atom, $C_{1-20}$-alkyl or $C_{3-10}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; $Z'$ is O or S;

$R^{3'}$ is a $C_{1-10}$-alkyl group, or $C_{6-10}$-aryl group optionally substituted by one or more halo groups;

n is independently 0 to 4, e.g. 0, 1 or 2; and each $R^1$ is independently a $C_{1-10}$-alkyl group.

Further preferred complexes of use in the invention are of formula (IV') or (IV):

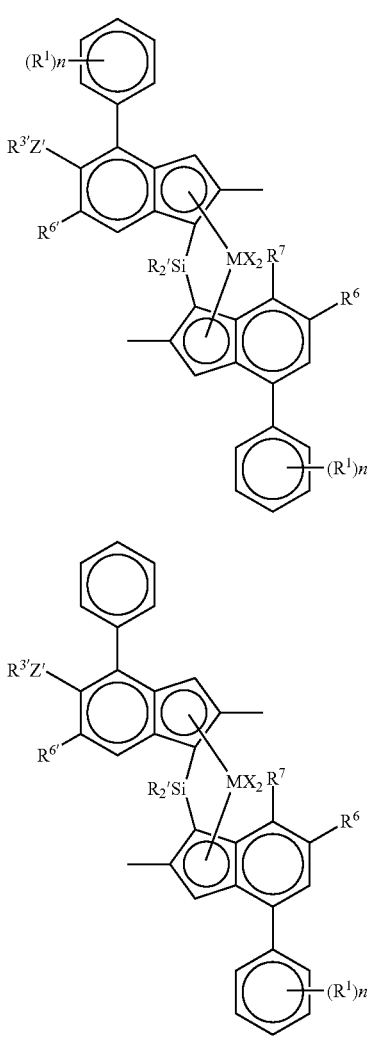

M is zirconium or hafnium;

each X is independently a hydrogen atom, a halogen atom, $C_{1-6}$-alkoxy group, $C_{1-6}$-alkyl, phenyl or benzyl group;

each R' is independently a hydrogen atom, $C_{1-20}$-alkyl or $C_{3-7}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; $Z'$ is O or S;

$R^{3'}$ is a $C_{1-10}$-alkyl group, or $C_{6-10}$-aryl group optionally substituted by one or more halo groups;

n is independently 0, 1 to 2; and each $R^1$ is independently a $C_{3-8}$-alkyl group.

Most preferably, the complex of use in the invention is of formula (V') or (V):

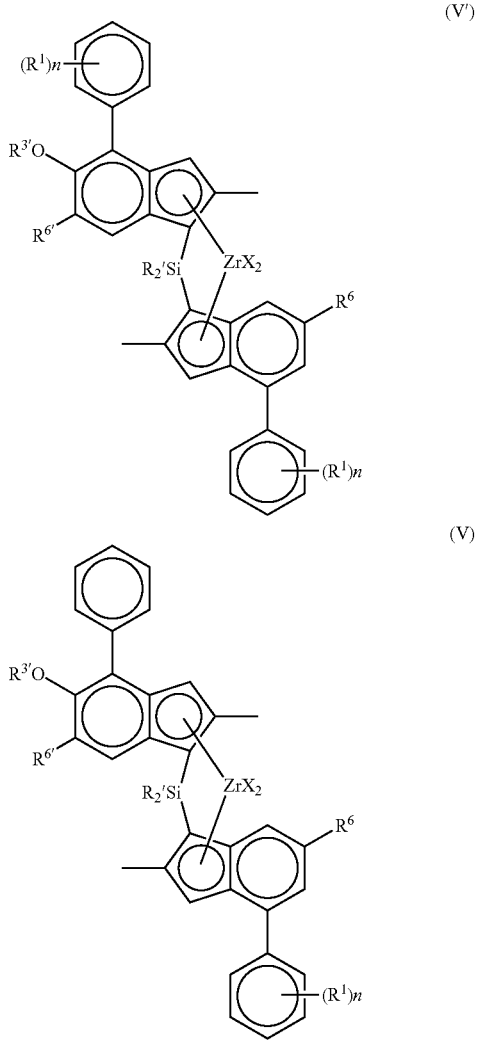

wherein each X is independently a hydrogen atom, a halogen atom, $C_{1-6}$-alkoxy group, $C_{1-6}$-alkyl, phenyl or benzyl group;

R' is independently a $C_{1-6}$-alkyl or $C_{3-10}$-cycloalkyl;

$R^1$ is independently $C_{3-8}$-alkyl;

$R^6$ is hydrogen or a $C_{3-8}$-alkyl group;

$R^{6'}$ is a $C_{3-8}$-alkyl group or $C_{6-10}$-aryl group, preferably a tertiary $C_{4-8}$-alkyl group;

$R^{3'}$ is a $C_{1-6}$-alkyl group, or $C_{6-10}$-aryl group optionally substituted by one or more halo groups;

and n is independently 0, 1 or 2.

Particular compounds of the invention include:

rac-anti-Me$_2$Si(2-Me-4-Ph-6-tBu-Ind)(2-Me-4-Ph-5-OMe-6-tBu-Ind)ZrCl$_2$, rac-anti-Me$_2$Si(2-Me-4-(p-tBuPh)-Ind)(2-Me-4-Ph-5-OMe-6-tBu-Ind)ZrCl$_2$ rac-anti-Me$_2$Si(2-Me-4-(3,5-di-tBuPh)-6-tBu-Ind)(2-Me-4-Ph-5-OMe-6-tBu-Ind)ZrCl$_2$ rac-anti-Me$_2$Si(2-Me-4-Ph-6-tBu-Ind)(2-Me-4,6-di-Ph-5-OMe-Ind)ZrCL$_2$ rac-anti-Me$_2$Si(2-Me-4-(p-tBuPh)-Ind)(2-Me-4-Ph-5-OC$_6$F$_5$)-6-iPr-Ind)ZrCl$_2$ rac-anti-Me(CyHex)Si(2-Me-4-Ph-6-tBu-Ind)(2-Me-4-Ph-5-OMe-6-tBu-Ind)ZrCl$_2$ rac-anti-Me$_2$Si(2-Me-4-(3,5-di-tBuPh)-7-Me-Ind)(2-Me-4-Ph-5-OMe-6-tBu-Ind)ZrCl$_2$ rac-anti-Me$_2$Si(2-Me-4-(3,5-di-tBuPh)-7-OMe-Ind)(2-Me-4-Ph-5-OMe-6-tBu-Ind)ZrCl$_2$ rac-anti-Me$_2$Si(2-Me-4-(p-tBuPh)-6-tBu-Ind)(2-Me-4-Ph-5-OMe-6-tBu-Ind)ZrCl$_2$ rac-anti-Me$_2$Si(2-Me-4-(p-tBuPh)-Ind)(2-Me-4-(4-tBuPh)-5-OMe-6-tBu-Ind)ZrCl$_2$ rac-anti-Me$_2$Si(2-Me-4-(p-tBuPh)-Ind)(2-Me-4-(3,5-tBu$_2$Ph)-5-OMe-6-tBu-Ind)ZrCl$_2$ rac-anti-Me$_2$Si(2-Me-4-(p-tBuPh)-Ind)(2-Me-4-Ph-5-OiBu-6-tBu-Ind)ZrCl$_2$ Most preferably rac-anti-Me$_2$Si(2-Me-4-(p-tBuPh)-Ind)(2-Me-4-Ph-5-OMe-6-tBu-Ind)ZrCl$_2$ is used.

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (VI):

(VI)

where n is from 6 to 20 and R has the meaning below.

Aluminoxanes are formed on partial hydrolysis of organoaluminum compounds, for example those of the formula AlR$_3$, AlR$_2$Y and Al$_2$R$_3$Y$_3$ where R can be, for example, C$_1$-C$_{10}$-alkyl, preferably C$_1$-C$_5$-alkyl, or C$_3$-C$_{10}$-cycloalkyl, C$_7$-C$_{12}$-arylalkyl or -alkylaryl and/or phenyl or naphthyl, and where Y can be hydrogen, halogen, preferably chlorine or bromine, or C$_1$C$_{10}$-alkoxy, preferably methoxy or ethoxy. The resulting oxygen-containing aluminoxanes are not in general pure compounds but mixtures of oligomers of the formula (VI).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used.

Boron containing cocatalysts of interest include those of formula (VII)

BY$_3$ (VII)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5- di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl)borane.

However it is preferred that as a boron containing cocatalyst borates are used, i.e. compounds containing a borate.

These compounds generally contain an anion of formula:

(Z)$_4$B–(VIII)

where Z is an optionally substituted phenyl derivative, said substituent being a halo-C$_{1-6}$-alkyl or halo group. Prefer red options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N- dimethylanilinium or p-nitro-N,N-dimethylanilinium.

Preferred ionic compounds which can be used according to the present invention include:

tributylammoniumtetra(pentafluorophenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylaniliniumtetrakis(pentafluorophenyl)borate,
N,N-dimethylcyclohexylammoniumtetrakis(pentafluorophenyl)borate or
N,N-dimethylbenzylammoniumtetrakis(pentafluorophenyl)borate According to the present invention, it is especially preferred to use an aluminoxane cocatalyst, like MAO, together with a boron containing cocatalyst, like borate cocatalyst.

Suitable amounts of co-catalyst will be well known to the skilled person.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Layer C

The optional layer (C) is either made of the polymer as defined for layer (A) or of the polymer as defined for layer (B).

Multilayer Film

The multilayer blown film according to the present invention comprises at least two layers (A) and (B) and optional one core layer (C).

If such core layer (C) is present, the stacking order of the at least three layers is A/C/B.

In the multilayer blown film according to the invention, layer (B) preferably acts as sealing layer and layer (A) preferably acts as stiff/tough layer.

The multilayer blown film may comprise further layers, for instance between the layer (A) and the core layer (C) and/or between the core layer (C) and layer (B). Accordingly, the total number of layers may be up to 9, like 8, 7, 6, 5 or 4 layers. However, it is preferred that the multilayer film consists of 5 layers, more preferably of 2 or 3 layers.

Thus in one preferred embodiment the multilayer blown film consists of one layer (A) and one layer (B), whereas in another preferred embodiment the multilayer blown film consists of one layer (A), one core layer (C) and layer (B).

Preferably, the multilayer blown film has a total thickness in the range of 10 to 2000 µm, more preferably in the range of 20 to 1000 µm, still more preferably in the range of 30 to 500 µm, and even more preferably in the range of 40 to 100 µm.

In the multilayer blown film according to the invention, layer (A) has a thickness in the range of 35 to 80%, preferably 40 to 70% and more preferably in the range of 45 to 60% with respect 30 to the total thickness of the multilayer film;

layer (B) has a thickness in the range of 5 to 40%, preferably 10 to 30% and more preferably in the range of 15 to 25% with respect to the total thickness of the multilayer film;

and layer (C) has a thickness in the range of 0 to 45%, preferably 10 to 40% and more preferably in the range of 15 to 35% with respect to the total thickness of the multilayer film.

Preferably, the multilayer blown film is an unstretched film. The term "unstretched" shall indicated, that the multilayer blown film is not dimensionally stretched as this is the case for biaxially oriented films. Accordingly, it is preferred that the multilayer blown film according to this invention is not biaxially stretched or uniaxially stretched. "Stretching" is a processing step, which stretches the film more than a film is stretched due to normal drawing effects caused by film making. For instance, a film in a cast film line is drawn and thus slightly stretched in machine direction. A similar effect occurs in a blown film line where the bubble is drawn. Such drawing effects, however, are not understood as stretching. Stretching is more than the drawing occurring in the cast film line or blown film line. Accordingly, the inventive multilayer blown film is non-stretched. Since the multilayer blown film is produced on a blown film line, the cooling of the multilayer blown film can be effected by water cooling or air cooling, the latter being preferred.

According to another preferred embodiment of the present invention the content of the Ziegler Natta catalyzed heterophasic propylene copolymer (HECO) in layer (A) is in the range of 80.0 to 100.0 wt.-%, preferably in the range of 90 to 100.0 wt.-%, more preferably in the range of 95.0 to 100.0 wt.-%, and most preferably layer (A) consists of the Ziegler Natta catalyzed 15 heterophasic propylene copolymer (HECO) and optional additives based on the overall weight of layer (A);

the content of the metallocene catalyzed propylene based random copolymer (PRC) in layer (B) is in the range of 80.0 to 100.0 wt.-%, preferably in the range of 90.0 to 100.0 wt.-%, more preferably in the range of 95.0 to 100.0 wt.-%, and most preferably layer (B) consists of 20 metallocene catalyzed propylene based random copolymer (PRC) and optional additives based on the overall weight of layer (B).

In case the multilayer blown film also comprises the core layer (C), the amount of either the Ziegler Natta catalyzed heterophasic propylene copolymer (HECO) or the metallocene catalyzed propylene based random copolymer (PRC) apply as for layers (A) or (B).

The preparation of a multilayer blown film is state of the art and not part of the invention. For instance a multilayer blown film is obtained by a blown film coextrusion process. In the blown film coextrusion process the melts of the polymer materials for the layer (A), layer (B), optional layer (C) and optionally for all further layers are extruded through an annular die and blown into a tubular film by forming a bubble which is collapsed between nip rollers after solidification. The blown film coextrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4.0, such as from 2.0 to 4.0, preferably 2.5 to 3.5.

Optionally one or both, surface(s) of the multilayer blown film can be corona- or flame-treated by one of the known methods. For the corona treatment, the film is passed between two conductor elements serving as electrodes, with such a high voltage, usually an alternating voltage (about 10000 V and 10000 Hz), being applied between the electrodes that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 48 dynes/cm after production.

Multilayer blown films according to the invention have an Elmendorf tear strength determined in accordance with ISO 6383/2 on a 50 µm multilayer blown film measured in machine direction (MD), in the range from at least 5.0 N/mm up to 25.0 N/mm, preferably 7.0 to 20.0 N/mm, and measured in transverse direction (TD) in the range of from at least 15.0 N/mm up to 50.0 N/mm, preferably 16.0 to 30 N/mm.

The tensile modulus determined according to ISO 527 at 23° C. on multilayer blown film with a thickness of 50 µm in machine direction as well as in transverse direction is in the range of from 800 to 1500 MPa, preferably in the range of from 850 to 1400 MPa.

Multilayer blown films of the invention have a sealing initiation temperature (SIT) (determined on 50 µm multilayer blown film as described in the experimental part) in the range of from 85° C. to below 120° C., preferably 90° C. to below 118° C., more preferably 95° C. to below 115° C.

The multilayer blown films can furthermore have a haze (determined according to ASTM D 1003-00 on 50 µm multilayer blown film) of below 25.0%, preferably of below 22.0%, and more preferably of below 20.0%.

Thus, the haze of the multilayer blown films is preferably in the range of from 1.0 to below more preferably in the range of from 2.0 to below 22.0%, and even more preferably in the range of from 3.0 to below 20.0%.

Multilayer blown films of the present invention furthermore have sufficient thermal stability to enable sterilization treatment, like steam sterilization treatment in a temperature range of about 120° C. to 130° C. with a duration of 15 to 45 minutes, without destroying the good optical properties.

Therefore, multilayer blown films of the present invention furthermore may have haze values (determined according to ASTM D 1003-00 on 50 µm blow film) after steam sterilization at 121° C. for 30 min of below 15.0%, preferably of below 12.0%, and more preferably of below 10.0%.

A suitable lower limit is for example 1.0%. Thus, suitable ranges for haze after steam sterilization are 1.0% to below 15.0%, preferably 2.0% to below 12.0% and more preferably 3.0% to below 10.0%.

Additionally, the multilayer blown films may have a dart-drop impact strength (DDI) determined according to ASTM D1709, method A on a 50 µm multilayer blown film of at least 20 g up to 300 g, more preferably in the range of 30 to 200 g, and still more preferably in the range of 40 to 180 g.

Viewed from another aspect, it is a constant need to provide films, which not only show improvements in one or two of these mechanical, sealing or optical properties. So it is desired to provide products with a well-balanced and continuously improved overall performance. Such an improvement in the overall performance of a blown film can be expressed by the resistance factor (R-factor).

In view of the present invention the resistance factor (R-factor) is understood as the ratio of mechanical (especially tear strength and tensile (MD)) behaviour, to sealing performance, namely sealing initiation temperature (SIT), wherein the mechanical properties are targeted to be as high as possible and the SIT is desired to be as low as possible.

The resistance factor (R-factor) can be determined by multiplying Tensile Modulus (MD) and tear strength (MD) and putting this product in relation to SIT determined on 50 µm multilayer blown film.

$$R-\text{factor} = \frac{\text{Tensile Modulus}(MD)[MPa] * \text{Tear}(MD)[N/mm]}{SIT[°C.]}$$

The resistance factor (R-factor) is preferably at least 50 up to 300, preferably in the range of from 60 up to 250, more preferably in the range of from 70 to 200, wherein the Tensile Modulus in machine direction is measured according to ISO 527-3 at 23° C. on 50 µm multilayer blown film , Tear is the Elmendorf tear strength determined in accordance with ISO 6383/2 measured in machine direction (MD) on a 50 µm multilayer blown film and SIT is the sealing initiation temperature (determined as described in the experimental part) on a 50 µm multilayer blown film.

It will be appreciated that any parameter mentioned above is measured according to the detailed test given below. In any parameter where a narrower and broader embodiment are disclosed, those embodiments are disclosed in connection with the narrower and broader embodiments of other parameters.

Use

The present invention also relates to the use of the multilayer film as defined above for flexible packaging applications, preferably pouches or lids for food packaging, for medical applications or for pharmaceutical applications.

The invention will now be described with reference to the following non-limiting examples.

EXPERIMENTAL PART

A. Measuring Methods

The following definitions of terms and determination methods apply for the above general description of the invention as well as to the below examples unless otherwise defined.

Melt Flow Rate

The melt flow rate (MFR) was determined according to ISO 1133 —Determination of the melt mass-flow rate (MFR) and melt volume-flow rate (MVR) of thermoplastics—Part 1: Standard method and is indicated in g/10 min. The MFR is an indication of the flowability, and hence the 10 processability, of the polymer. The higher the melt flow rate, the lower the viscosity of the polymer. The $MFR_2$ of polyethylene is determined at a temperature of 190° C. and a load of 2.16 kg. The $MFR_2$ of polypropylene is determined at a temperature of 230° C. and a load of 2.16 kg.

Calculation of melt flow rate $MFR_2$ (230° C.) of the polymer fraction (PRC-2):

$$MFR(PRC-2) = 10^{\left[\frac{\log(MFR(PRC))-w(PRC-1)\times\log(MFR(PRC-1))}{w(A2)}\right]}$$

wherein w(PRC-1) is the weight fraction [in wt.-%] of the polymer fraction PRC-1 w(A2) is the weight fraction [in wt.-%] of the polymer fraction PRC-2,

MFR(PRC-1) is the melt flow rate $MFR_2$ (230° C.) [g/10 min] of the polymer fraction PRC-1, MFR(PRC) is the melt flow rate $MFR_2$ (230° C.) [g/10 min] of the propylene random copolymer (PRC), MFR(PRC-2) is the calculated melt flow rate $MFR_2$ (230° C.) [g/10 min] of the polymer fraction PRC-2.

Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification.

Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\%]=100*fE$$

The weight percent comonomer incorporation was calculated from the mole fraction:

$$E[wt\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of Comonomer Content of the Second Polymer Fraction (PRC-2):

$$(C(PRC)-w(PRC-1)\times C(PRC-1))/(w(PRC-2))=C(PRC-2)$$

wherein w(PRC-1) is the weight fraction [in wt.-%] of the first polymer fraction (PRC-1), w(PRC-2) is the weight fraction [in wt.-%] of second polymer fraction (PRC-2), C(PRC-1) is the comonomer content [in wt.-%] of the first polymer fraction (PRC-1), C(PRC) is the comonomer content [in wt.-%] of the propylene random copolymer (PRC), C(PRC-2) is the calculated comonomer content [in wt.-%] of the second polymer fraction (PRC-2).

Xylene Cold Solubles (XCS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25 +/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\%=(100*m*V_0)/(m_0*v); m_0=\text{initial polymer amount (g); m=weight of residue (g); } V_0=\text{initial volume (ml); v=volume of analysed sample (ml).}$$

Melting Temperature $T_m$ and Crystallization Temperature $T_c$

The parameters are determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) is determined from the cooling step, while the melting temperature ($T_m$) is determined from the second heating step. Melting and crystallization temperatures were taken as the peaks of endotherms and exotherms.

Sealing Initiation Temperature (SIT); (Sealing End Temperature (SET), Sealing Range)

The method determines the sealing temperature range (sealing range) of polypropylene films, in particular blown films. The sealing temperature range is the temperature range, in which the films can be sealed according to conditions given below. The lower limit (heat sealing initiation temperature (SIT)) is the sealing temperature at which a sealing strength of 5+/−0,5 N is achieved. The upper limit (sealing end temperature (SET)) is reached, when the films stick to the sealing device.

The sealing range was determined on a J&B Universal Sealing Machine Type 3000 of the multilayer films as produced indicated below with the following parameters:

Specimen width: 25.4 mm
Seal Pressure: 0.1 N/mm²
Seal Time: 0.1 sec
Cool time: 99 sec
Peel Speed: 10 mm/sec
Start temperature 80° C.
End temperature: 150° C.
Increments: 10° C.

specimen is sealed A to A at each seal bar temperature and seal strength (force) is determined at each step. The temperature is determined at which the seal strength reaches 5 N.

Flexural Modulus

The flexural modulus was determined in 3-point-bending according to ISO 178 on 80×10×4 mm³ test bars injection molded at 23° C. in line with EN ISO 1873-2.

Tear resistance (determined as Elmendorf tear (N)): Applies both for the measurement in machine direction (MD) and transverse direction (TD). The tear strength is measured using the ISO 6383/2 method. The force required to propagate tearing across a film sample is measured using a pendulum device. The pendulum swings under gravity through an arc, tearing the specimen from pre-cut slit. The film sample is fixed on one side by the pendulum and on the other side by a stationary clamp. The tear resistance is the force required to tear the specimen. The relative tear resistance (N/mm) is then calculated by dividing the tear resistance by the thickness of the film.

Tensile Modulus

Tensile modulus in machine and transverse direction were determined according to ISO 527-3 at 23° C. on the multilayer films as produced indicated below. Testing was performed at a cross head speed of 1 mm/min.

Dart Drop Strength (DDI)

Dart-drop was measured using ASTM D1709, method A (Alternative Testing Technique) from the multilayer films as produced indicated below. A dart with a 38 mm diameter hemispherical head is dropped from a height of 0.66 m onto a multilayer film clamped over a hole. Successive sets of twenty specimens are tested. One weight is used for each set and the weight is increased (or decreased) from set to set by uniform increments. The weight resulting in failure of 50% of the specimens is calculated and reported.

Haze was determined according to ASTM D 1003-00 on multilayer films as produced indicated below.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

B. Examples:

heterophasic propylene copolymer (HECO) for layer (A) and optional layer (C)

The catalyst used in the polymerization process for the heterophasic propylene copolymer (HECO) of the inventive example (IE1), (IE2) and CE2 was prepared as described below and was used together with triethyl-aluminium (TEA) as co-catalyst and dicyclopentyl dimethoxy silane (donor D) as donor.

1a) Catalyst preparation 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by N2 sparging for 20 minutes to yield an air sensitive powder.

1b) VCH modification of the catalyst 35 ml of mineral oil (Paraffinum Liquidum PL68) were added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

The HECO was produced in a Borstar pilot plant with a prepolymerization reactor, one slurry loop reactor and two gas phase reactors.

The solid catalyst was used in all cases along with triethyl-aluminium (TEAL) as cocatalyst and dicyclo-pentyl-dimethoxysilane (D-donor) as donor. The aluminium to donor ratio was 5 mol/mol, the TEAL/Ti-ratio was 90 mol/mol.

Polymerization data is shown in Table 1.

TABLE 1

Polymerization data for HECO

|  | Unit | HECO |
|---|---|---|
| Prepolymerization |  |  |
| Temperature | ° C. | 30 |
| TEAL/Ti ratio | mol/mol | 173 |
| TEAL/Donor ratio | mol/mol | 8.0 |
| Loop reactor |  |  |
| Temperature | ° C. | 80 |
| Split | wt.-% | 39 |
| H2/C3 | mol/kmol | 0.4 |
| XCS | wt.-% | 2.4 |
| MFR | g/10 min | 2.4 |
| GPR 1 |  |  |
| Temperature | ° C. | 80 |
| Split | wt.-% | 50 |
| H2/C3 | mol/kmol | 7 |
| XCS | wt.-% | 1.7 |
| $MFR_M$ | g/10 min | 2.4 |
| GPR 2 |  |  |
| Temperature | ° C. | 75 |
| Split | wt.-% | 11 |
| C2/C3 | mol/kmol | 223 |
| H2/C2 | mol/kmol | 551 |
| C2 total | wt.-% | 4.2 |
| XCS | wt.-% | 15.0 |
| C2(XCS) | wt.-% | 28.0 |
| IV(XCS) | dl/g | 2.2 |
| $MFR_T$ | g/10 min | 3.0 |

The HECO was stabilized by melt mixing on a co-rotating twin-screw extruder at 200-230° C. with 0.2 wt.-% of Irganox B225 (1:1-blend of Irganox 1010 (Pentaerythrityltetrakis(3-(3',5'-di-tert.butyl-4-hydroxytoluyl)-propionate, CAS-no. 6683-19-8, and tris (2,4-di-t-butylphenyl) phosphate) phosphite), CAS-no. 31570-04-4, of BASF AG, Germany), 0.1 wt.-% calcium stearate (CAS-no.1592-23-0, commercially available from Faci, Italy) and 0.05 wt.-% of Hyperform HPN-20E (comprising 1,2-cyclohexane dicarboxylicacid, Ca-salt, commercially available from Milliken, USA).

TABLE 2 properties of HECO

| Final product | HECO |
|---|---|
| $MFR_2$ [g/10 min] total | 3.0 |
| $C_2$ content [wt.-%] total | 4.2 |
| XCS [wt.-%] | 14.0 |
| $C_2$ of XCS [wt.-%] | 28.0 |
| Intrinsic viscosity of XCS [dl/g] | 2.2 |
| $T_m$ (DSC) [° C.] | 167 |
| $T_c$ (DSC) [° C.] | 128 |
| Flexural Modulus [MPa] | 1400 |

Propylene-ethylene random copolymer (PRC) for layer (B) and optional layer (C) The catalyst used in the polymerization processes for the $C_2C_3$ random copolymer of the inventive examples (IE1, IE2) and (CE1) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

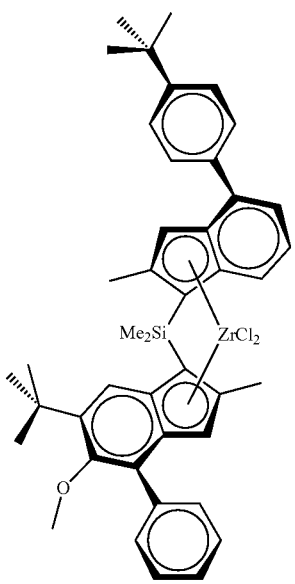

has been synthesized according to the procedure as described in WO2013007650, E2.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful 15 pressuring and depressurising with nitrogen using manual valves. Then toluene (32 kg) was added. The mixture was stirred for 15 min. Next 30 wt.-% solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was 20 washed twice with toluene (32 kg) at 90° C., following by settling and filtration. The reactor was cooled off to 60° C. and the solid was washed with heptane (32.2 kg). Finally MAO treated SiO2 was dried at 60° C. under nitrogen flow for 2 hours and then for 5 hours under vacuum (−0.5 barg) with stirring. MAO treated support was collected as a free-flowing white powder found to contain 12.6% Al by weight.

Catalyst System Preparation 30 wt.-% MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9 wt.-% Al and 0.26 wt.-% Zr The polymerization for preparing the inventive $C_2C_3$ random copolymer (PRC) was performed in a Borstar pilot plant with a 2-reactor set-up (loop-gas phase reactor (GPR 1)). In Table 3 the polymerization conditions are given.

TABLE 3

|  | IE1 |
|---|---|
| Prepoly reactor | |
| Temperature [° C.] | 25 |
| Pressure [Pa] | 5149 |
| Catalyst feed [g/h] | 2.0 |
| $C_3$ feed [kg/h] | 52 |
| $H_2$ feed [g/h] | 0.3 |
| Residence time [h] | 0.4 |
| loop reactor | |
| Temperature [° C.] | 68 |
| Pressure [Pa] | 5385 |
| Feed $H_2/C_3$ ratio [mol/kmol] | 0.24 |
| Feed $C_2/C_3$ ratio [mol/kmol] | 48.3 |
| Polymer Split [wt.-%] | 67 |
| $MFR_2$ [g/10 min] (MFR of PRC-1) | 2.0 |
| Total $C_2$ loop [wt.-%] ($C_2$ of PRC-1) | 3.7 |
| XCS loop [wt.-%] | 3.5 |
| Residence time | 0.4 |
| GPR1 | |
| Temperature [° C.] | 75 |
| Pressure [Pa] | 2500 |
| $H_2/C_3$ ratio [mol/kmol] | 2.0 |
| $C_2/C_3$ ratio [mol/kmol] | 224 |
| Polymer residence time [h] | 1.8 |
| Polymer Split [wt.-%] | 33 |
| Total $MFR_2$ [g/10 min] | 1.1 |
| $MFR_2$ [g/10 min] in GPR1 (MFR of PRC-2) | 0.3 |
| Total $C_2$ [wt.-%] (loop + GPR1) | 4.1 |
| $C_2$ in GPR1 [wt.-%] ($C_2$ of PRC-2) | 4.9 |
| Total XCS [wt.-%] | 4.7 |

The polymer powder was compounded in a co-rotating twin-screw extruder Coperion ZSK 57 at 220° C. with 0.2 wt.-% antiblock agent (synthetic silica; CAS-no. 7631-86-9); 0.1 wt.-% antioxidant (Irgafos 168FF); 0.1 wt.-% of a sterical hindered phenol (Irganox 1010FF); 0.02 wt.-% of Ca-stearat) and 0.02 wt.-% of a non-lubricating stearate (Synthetic hydrotalcite; CAS-no. 11097-59-9).

TABLE 4

| polymer properties | |
|---|---|
| Pellet | IE1 |
| XCS [wt.-%] | 4.6 |
| Total $C_2$ [wt.-%] | 4.1 |
| MFR2 [g/10 min] | 1.1 |
| Tm [° C.] | 125 |
| Tc [° C.] | 85 |

Manufacturing of multilayer films

Three layer blown polymer films were produced on a three layer Collin lab scale blown film line. The melt temperature of the layer (A) and layer (B) was 185° C. to 195° C. The melt temperature of the core layer (C) was in the range of 205° C. to 215° C. The throughput of the extruders was in sum 80 kg/h. The film structure was A-C-B with a core layer of 15 μm (C), layer (A) of 25 μm and layer (B) of 10 μm. Layer thickness has been determined by Scanning Electron Microscopy. The material used for the layers multilayer films is indicated in the table 5. The properties of the multilayer films are indicated in table 6.

TABLE 5

| Produced multilayer films. | | | | |
|---|---|---|---|---|
|  | IE1 | IE2 | CE1 | CE2 |
| Layer (A) | HECO | HECO | PRC | HECO |
| Amount [wt.-%] | 100 | 100 | 100 | 100 |
| Layer (B) | PRC | PRC | PRC | HECO |
| Amount [wt.-%] | 100 | 100 | 100 | 100 |

TABLE 5-continued

| Produced multilayer films. | | | | |
|---|---|---|---|---|
|  | IE1 | IE2 | CE1 | CE2 |
| Layer (C) | PRC | HECO | PRC | HECO |
| Amount [wt.-%] | 100 | 100 | 100 | 100 |
| Total Thickness [μm] | 50 | 50 | 50 | 50 |

TABLE 6

| Properties of the 50 μm multilayer blown films. | | | | | |
|---|---|---|---|---|---|
|  | Unit | IE1 | IE2 | CE1 | CE2 |
| SIT | ° C. | 110 | 109 | 109 | 144 |
| Tensile Modulus MD | MPa | 988 | 1223 | 638 | 1572 |
| Tensile Modulus TD | MPa | 946 | 1054 | 664 | 1314 |
| Tear MD | N/mm | 18.1 | 7.4 | 6.6 | 4.2 |
| Tear TD | N/mm | 16.7 | 20.6 | 21.2 | 13.8 |
| DDI | g | 44 | 109 | 43 | 161 |
| Haze b.s. | % | 9.0 | 18.4 | 4.9 | 18.1 |
| Haze a.s. | % | 9.3 | 9.3 | 4.9 | 17.8 |
| R-factor |  | 162 | 82 | 38.6 | 46 | b.s. before steam sterilization
a.s. after steam sterilization

As can be seen from the above table, the inventive multilayer blown films have a more balanced combination of mechanical-optical-sealing properties.

The invention claimed is:

1. A multilayer blown film comprising at least two layers (A) and (B) and one core layer (C) located between layer (A) and (B), wherein layer (A) comprises a Ziegler Natta catalyzed heterophasic propylene copolymer (HECO) and layer (B) comprises a metallocene catalyzed propylene based random copolymer (PRC), wherein:
said heterophasic propylene copolymer (HECO) of Layer A comprises;
a) 75.0 to 95.0 wt. % of a polypropylene matrix (PP-M) with an $MFR_2$ (ISO 1133, 230° C., 2.16 kg) of 0.8 to 10.0 g/10 min being a homopolymer or a copolymer which has an alpha-olefin comonomer content of less than 2.0 wt. %,
b) 5.0 to 25.0 wt. % of an elastomeric propylene-ethylene copolymer (EPC) dispersed in said matrix (PP-M) and
c) 0.0 to 0.5 wt. % of one or more alpha-nucleating agent(s) (NA), and is produced in the presence of a Ziegler Natta catalyst, the heterophasic propylene copolymer (HECO) having
(i) a melt flow rate $MFR_2$ measured according to ISO 1133 (230° C., 2.16 kg load) in the range of 0.3 to 5.0 g/10 min;
(ii) a melting temperature measured with DSC according to ISO 11357-3 in the range of 160° C. to 170° C.
(iii) a xylene cold soluble (XCS) fraction determined according to ISO 16152 (25° C.) in the range of 5.0 to 25.0 wt. % based on the total weight of the heterophasic propylene copolymer (HECO); the xylene cold soluble (XCS) fraction having
an intrinsic viscosity (IV) of 0.8 to 2.8 dl/g;
an ethylene content in the range of 10.0 to 45.0 wt. %,
(iv) a total ethylene content in the range of 1.0 to 10.0 wt. %,
said propylene based random copolymer (PRC) of Layer B comprises
(i) alpha-olefin comonomers selected from ethylene and/or 1-butene in a total amount of 2.0 to 8.0 wt. %;

(ii) a melting temperature measured with DSC according to ISO 11357-3 in the range of 115° C. to 140° C.

and is produced in the presence of a metallocene catalyst, and wherein the core layer (C) comprises either the Ziegler Natta catalyzed heterophasic propylene copolymer (HECO) or the metallocene catalyzed propylene based random copolymer (PRC).

2. The multilayer blown film according to claim 1, wherein the polypropylene matrix (PP-M) of the Ziegler Natta catalyzed heterophasic propylene copolymer (HECO) is a propylene homopolymer having a melt flow rate MFR2 (ISO 1133; 230° C.; 2.16 kg) in the range of 0.8 to 10.0 g/10 min.

3. The multilayer blown film according to claim 1, wherein the heterophasic propylene copolymer (HECO) comprises 0.0001 to 0.5 wt. % of an alpha-nucleating agent (NA), the alpha-nucleating agent being either a polymeric nucleating agent or an alpha-nucleating agent selected from the group consisting of 1,3:2,4-bis-(3,4-dimethyl-benzylidene)-sorbitol, sodium-2,2'-methylenebis-(4,6-di-tert-butyl-phenyl)-phosphate, hydroxybis-(2,4,8,10-tetra-tert-butyl-6-hydroxy-12h-dibenzo-(d,g)(1,3,2)-dioxaphosphocin-oxidato)-aluminium, 1,2-cyclohexane dicarboxylic acid, Ca-salt; or mixtures thereof.

4. The multilayer blown film according to claim 1, wherein the propylene based random copolymer (PRC) is a propylene-ethylene random copolymer having:
  (a) a total ethylene content in the range of from 3.0 to 7.0 wt. %
  (b) a melt flow rate MFR2 (230° C./2.16 kg) measured according to ISO 1133 in the range of from 0.6 to 5.0 g/10 min, and
  (c) a melting temperature Tm as determined by DSC according to ISO 11357 of from 115° C. to 135° C.

5. The multilayer blown film according to claim 4, wherein the propylene-ethylene random copolymer consists of:
  45.0 to 85.0 wt. % of polymer fraction (PRC-1) having,
  (i) an ethylene content in the range of from 1.5 to 5.0 wt. % and
  (ii) a melt flow rate MFR2 (230° C/2.16 kg) measured according to ISO 1133 in the range of from 0.8 to 8.0 g/10 min and
  15.0 to 55.0 wt. % of polymer fraction (PRC-2) having,
  (i) an ethylene content in the range of from 4.0 to 10.0 wt. % and
  (ii) a melt flow rate MFR2 (230° C/2.16 kg) measured according to ISO 1133 in the range of from 0.1 to 3.0 g/10 min, whereby the melt flow rate MFR2 (230° C./2.16 kg) of polymer fraction (PRC-2) is lower than the MFR2 (230° C./2.16 kg) of polymer fraction (PRC-1).

6. The multilayer blown film according to claim 1, wherein the multilayer blown film has a total film thickness of from 10 to 2000 µm.

7. The multilayer blown film according to claim 1, wherein layer (A) has a thickness in the range of 35 to 80% with respect to the total thickness of the multilayer film;
  layer (B) has a thickness in the range of 5 to 40% with respect to the total thickness of the multilayer film;
  and layer (C) has a thickness up to 45%, with respect to the total thickness of the multilayer film.

8. The multilayer blown film according to claim 1, wherein the multilayer blown film has an Elmendorf tear strength (measured on a 50 µm multilayer blown film) determined in accordance with ISO 6383/2 measured in machine direction (MD), in the range from at least 5.0 N/mm up to 25.0 N/mm, and measured in transverse direction (TD) in the range of from at least 15.0 N/mm up to 50.0 N/mm.

9. The multilayer blown film according to claim 1, wherein the multilayer blown film has a sealing initiation temperature (SIT) (determined as described in the experimental part) in the range from 85° C. to below 120° C.

10. The multilayer blown film according to claim 1, wherein the multilayer blown film has a tensile modulus in machine (MD) direction determined acc. to ISO 527-3 on a 50 µm multilayer blown film in the range of from 800 to 1500 MPa.

11. The multilayer blown film according to claim 1, wherein the film has a resistance factor (R-factor) according to formula:

$$R-\text{factor} = \frac{\text{Tensile Modulus}(MD)[MPa] * \text{Tear}(MD)[N/\text{mm}]}{SIT[° C.]}$$

of at least 50 up to 300 wherein the Tensile Modulus in machine direction is measured according to ISO 527-3 at 23° C. on 50 µm multilayer blown film, Tear is the Elmendorf tear strength determined in accordance with ISO 6383/2 measured in machine direction (MD) on a 50 µm multilayer blown film and SIT is the sealing initiation temperature (determined as described in the experimental part) on a 50 µm multilayer blown film.

12. The multilayer blown film according to claim 1, wherein the film has a dart-drop impact strength (DDI) determined according to ASTM D1709, method A on a 50 µm multilayer blown film of at least 20 g up to 300 g.

* * * * *